(12) United States Patent
Ikebe et al.

(10) Patent No.: US 8,023,083 B2
(45) Date of Patent: Sep. 20, 2011

(54) LIQUID CRYSTAL DEVICE, METHOD FOR MANUFACTURING THE SAME, AND ELECTRONIC APPARATUS INCLUDING THE SAME

(75) Inventors: Tomo Ikebe, Suwa (JP); Yutaka Tsuchiya, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 464 days.

(21) Appl. No.: 12/178,901

(22) Filed: Jul. 24, 2008

(65) Prior Publication Data

US 2009/0051862 A1    Feb. 26, 2009

(30) Foreign Application Priority Data

Aug. 23, 2007    (JP) .................................. 2007-216789

(51) Int. Cl.
*G02F 1/1337* (2006.01)
(52) U.S. Cl. ........................................ 349/123; 349/125
(58) Field of Classification Search .................. None
See application file for complete search history.

(56) References Cited

U.S. PATENT DOCUMENTS 5,054,889 A * 10/1991 Imanishi et al. ............... 349/123

FOREIGN PATENT DOCUMENTS

| JP | 03-233428 | 10/1991 |
|---|---|---|
| JP | 2005-031196 | 2/2005 |
| JP | 2007-078769 | 3/2007 |
| JP | 2007-155950 | 6/2007 |

OTHER PUBLICATIONS

Machine translation of JP 2007-078769.*
Machine translation of JP 2006-195033.*

* cited by examiner

*Primary Examiner* — Lucy P Chien
(74) *Attorney, Agent, or Firm* — Lowe Hauptman Ham & Berner, LLP (57) ABSTRACT

A liquid crystal device includes a first substrate, a second substrate, a liquid crystal layer disposed between the first substrate and the second substrate, a first alignment layer disposed on the liquid crystal layer side of the first substrate, and a second alignment layer disposed on the liquid crystal layer side of the second substrate. At least one of the first alignment layer and the second alignment layer is made of an inorganic porous film having pores exposed at its surface and grooves to control the orientation of the liquid crystal layer.

12 Claims, 6 Drawing Sheets

LIQUID CRYSTAL DEVICE, METHOD FOR MANUFACTURING THE SAME, AND ELECTRONIC APPARATUS INCLUDING THE SAME

RELATED APPLICATIONS

The present application is based on, and claims priority from, Japanese Application Number 2007-216789, filed Aug. 23, 2007, the disclosure of which is hereby incorporated by reference herein in its entirety.

BACKGROUND

1. Technical Field

The present invention relates to a liquid crystal device including alignment layers controlling the orientation of the liquid crystal molecules, a method for manufacturing the liquid crystal device, and an electronic apparatus including the liquid crystal device.

2. Related Art

Liquid crystal devices are used as, for example, light valves of liquid crystal projectors. A liquid crystal device includes a pair of substrates and a liquid crystal layer disposed between the substrates with a sealing member. Alignment layers controlling the orientation of liquid crystal molecules constituting the liquid crystal layer are disposed on the liquid crystal layer sides of the substrates. The alignment layers are made of an organic film, such as polyimide film.

In the liquid crystal device having such a structure, unfortunately, moisture, impurity ions, and polar materials permeate into a space between the substrate through the sealing member or the like. This accelerates the degradation of the alignment layers and the liquid crystal layer by strong light from the light source of the liquid crystal device, for example, a liquid crystal projector. In addition, those impurities reduce the hold capacitance and further reduce the resistance to increase the current, thus causing display failure. Accordingly, for example, JP-A-3-233428 discloses a technique in which porous inorganic particles are dispersed in the alignment layers to absorb moisture, impurity ions and polar materials.

This technique, however, cannot establish a satisfying alignment of the liquid crystal molecules around the inorganic particles. Consequently, problems, such as display failure, undesirably occur. For example, when black is displayed, light leakage occurs. Particularly in liquid crystal projectors, such display failure is conspicuous in enlarged images. In addition, the thickness of the liquid crystal layer is increasingly reduced and finally to a degree smaller than the particle size of the inorganic particles. Consequently, inorganic particles cannot be used.

SUMMARY

The invention has been made to solve the above problems, and can be embodied as below.

According to an aspect of the invention, a liquid crystal device is provided which includes a first substrate, a second substrate, a liquid crystal layer disposed between the first substrate and the second substrate, a first alignment layer disposed on the liquid crystal layer side of the first substrate, and a second alignment layer disposed on the liquid crystal layer side of the second substrate. At least one of the first alignment layer and the second alignment layer is made of an inorganic porous film having pores exposed at its surface and grooves to control the orientation of the liquid crystal layer.

Since the alignment layer is made of an inorganic porous film with the pores of the porous film exposed at the surface, the pores can easily absorb moisture permeating between the substrates. In addition, the porous alignment layers can prevent display failure, such as light leakage, without disturbing the alignment, in comparison with the structure containing fine particles or the like, and thus can increase the quality (for example, contrast) of displayed images. Furthermore, the structure is not affected by the diameter of the particles or the like, and thus meets the demand for a thinner liquid crystal layer.

Preferably, one of the pores has a diameter smaller than the width of the groove to which the one of the pores belongs.

Since some of the pores are smaller than the width of the groove to which the some of the pores belong, the control of the liquid crystal orientation can be enhanced.

According to another aspect of the invention, an electronic apparatus including the liquid crystal device is provided.

The electronic apparatus can display high-quality images, for example, high contrast images.

According to still another aspect of the invention, a method for manufacturing a liquid crystal device is provided. The liquid crystal device includes a pair of substrates and a liquid crystal layer disposed between the substrates. The method includes: forming an inorganic porous film having pores over at least one of the pair of substrates; and irradiating the surface of the porous film with ion beams in a predetermined direction to expose the pores of the porous film at the surface of the porous film and to form grooves for controlling of the orientation of the liquid crystal layer.

In the method, the porous film is irradiated with ion beams, so that grooves are formed with pores exposed at the surface of the porous film. The pores can absorb moisture or the like permeating between the substrates. In addition, the irradiation of ion beams forms a pretilt angle at which liquid crystal molecules are aligned in a predetermined direction. The porous alignment layer can prevent display failure, such as light leakage, without disturbing the alignment, in comparison with the structure containing fine particles or the like, and thus can increase the quality (for example, contrast) of displayed images. Furthermore, the structure is not affected by the diameter of the particles or the like, and thus meets the demand for a thinner liquid crystal layer.

Preferably, the porous film is formed by a sol-gel method.

In the sol-gel method, a solution is applied and then fired to form the alignment layer. Thus, the alignment layer can be formed relatively quickly.

Alternatively, the porous film may be formed by vapor deposition.

Vapor deposition can form a more uniform, more homogeneous porous film than the sol-gel method.

BRIEF DESCRIPTION OF THE DRAWINGS

The invention will be described with reference to the accompanying drawings, wherein like numbers reference like elements.

FIGS. 1A and 1B are schematic views of the structure of a liquid crystal device according to a first embodiment of the invention.

DESCRIPTION OF EXEMPLARY EMBODIMENTS

First Embodiment

Figure 1A:
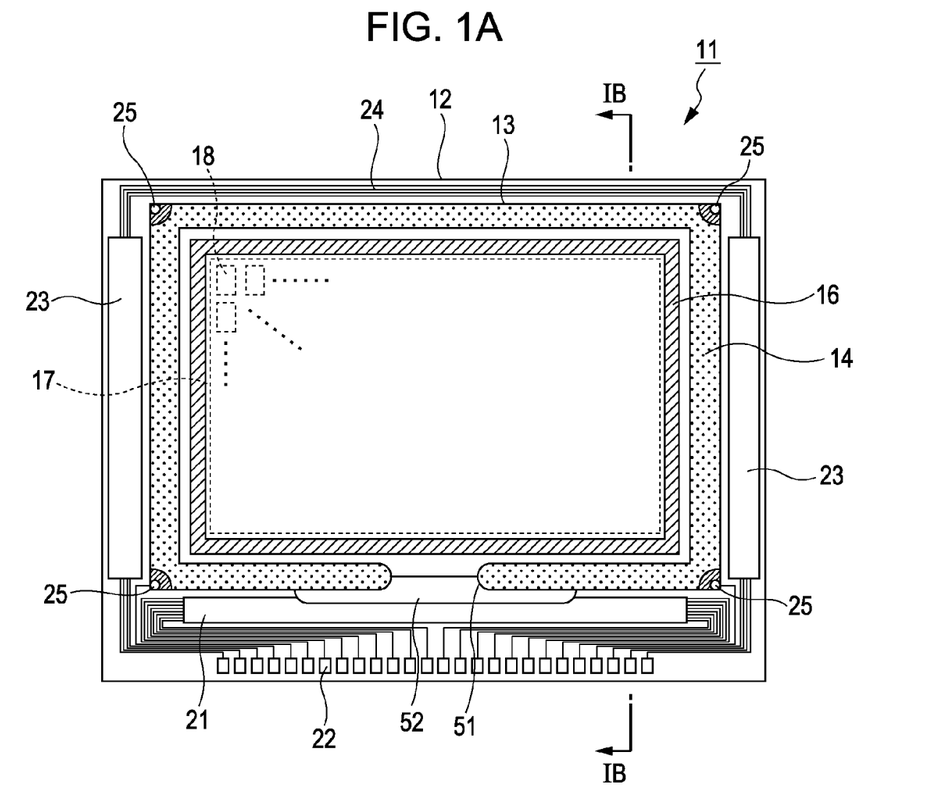
FIG. 1A being a plan view of the liquid crystal device.
Figure 1B:
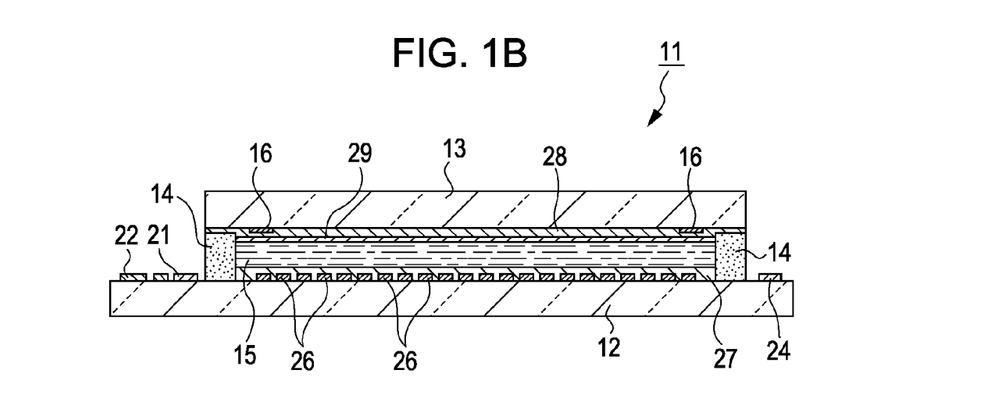
FIG. 1B being a cross sectional view of the liquid crystal device taken along line IB-IB in FIG. 1A.

FIGS. 1A and 1B show the structure of a liquid crystal device according to an embodiment of the invention. FIG. 1A is a schematic plan view of the liquid crystal device and FIG. 1B is a sectional view of the liquid crystal device taken along line IB-IB in FIG. 1A. The structure of the liquid crystal device will now be described with reference to FIGS. 1A and 1B.

The liquid crystal device 11 is of, for example, a TFT active matrix type including thin film transistors (hereinafter referred to as TFT elements) used as switching elements of pixels. The liquid crystal device 11 includes a pair of substrates: an element substrate 12 and an opposing substrate 13. The substrates are bonded together with a sealing member 14 formed in a rectangular frame when viewed from above, and a liquid crystal layer 15 is sealed in the space surrounded by the sealing member 14. Also, a liquid crystal inlet 51 and a sealant 52 are provided so as to be able to inject and seal a liquid crystal material.

The liquid crystal layer 15 can be made of, for example, a liquid crystal material having a positive dielectric constant anisotropy. The liquid crystal device 11 is provided with a surrounding partition made of a light-shielding material in a frame form when viewed from above, along the inner walls of the sealing member 14. The region surrounded by the surrounding partition 16 is defined as a display region 17.

In the display region 17, pixel regions 18 are arrayed in a matrix manner. Each pixel region 18 defines a pixel, which is a minimum unit of the display region 17. In the outside of the sealing member 14, a data line driving circuit 21 and external circuit mounting terminals 22 are disposed along an side (lower side in FIG. 1) of the element substrate 12, and scanning line driving circuits 23 are disposed along two sides adjacent to that side. Along the other side (upper side in FIG. 1) of the element substrate 12, a plurality of wires 24 extend to connect the scanning line driving circuits 23 disposed on opposing two sides of the element substrate 12.

On the other hand, the opposing substrate 13 has intersubstrate conducting members 25 for electrical continuity between the element substrate 12 and the opposing substrate 13 in the corners. The liquid crystal device 11 may be of transmissive type. The transmissive liquid crystal device modulates light from a backlight (not shown) disposed under the element substrate 12 (bottom side of FIG. 1B) and emits the light as imaging light through the opposing substrate 13.

In addition, a plurality of pixel electrodes 26 are formed on the inner surface side (liquid crystal layer 15 side) of the element substrate 12, as shown in FIG. 1B. These pixel electrodes 26 are covered with a first alignment layer 27. The pixel electrode 26 is an electroconductive film made of a transparent electroconductive material, such as ITO (indium tin oxide). On the inner surface side (liquid crystal layer 15 side) of the opposing substrate 13, the surrounding partition 16 is disposed, and a common electrode 28 is spread over the surrounding partition 16. A second alignment layer 29 is formed over the common electrode 28. The common electrode 28 is an electroconductive film made of a transparent electroconductive material, such as ITO. Although the liquid crystal device 11 further includes an insulating interlayer acting as an insulating layer and other parts, those parts are not described herein or shown in the drawings.

Figure 2:
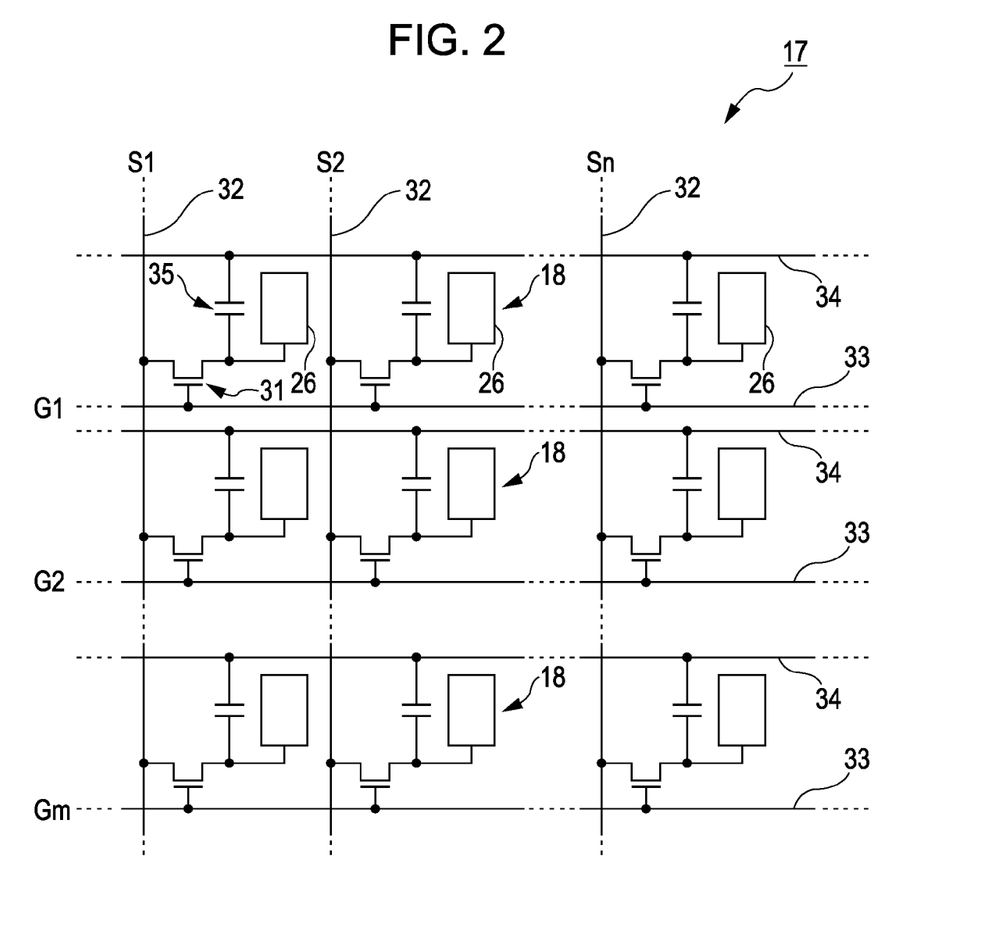
FIG. 2 is a diagram of the equivalent circuit showing the electrical configuration of the liquid crystal device.

FIG. 2 shows an equivalent circuit of the liquid crystal device. The electrical structure of the liquid crystal device will now be described with reference to FIG. 2.

The liquid crystal device 11 includes a plurality of pixel regions 18 constituting the display region 17. The pixel regions 18 have their respective pixel electrodes 26. A TFT element 31 is disposed in each pixel region 18.

The TFT element 31 acts as a switching element that controls the energization of the corresponding pixel electrode 26. The source of the TFT element 31 is electrically connected to a corresponding data line 32 to which an image signal Sn (S1, S2, etc.) is supplied from, for example, the data line driving circuit 21 shown in FIGS. 1A and 1B.

The gate of the TFT element 31 is electrically connected to a corresponding scanning line 33 to which a pulsed scanning signal Gm (G1, G2, etc.) is supplied at a predetermined timing from, for example, the scanning line driving circuit 23 shown in FIG. 1. The drain of the TFT element 31 is electrically connected to the corresponding pixel electrode 26.

The switching element, or the TFT element 31, is turned on for a predetermined time by the scanning signal Gm (G1, G2, etc.) from the scanning line 33, and thereby the image signal Sn (S1, S2, etc.) from the data line 32 is written in the pixel region 18 through the pixel electrode 26 at a predetermined timing.

The image signal Sn written in the pixel region 18, which has a predetermined level, is held for a predetermined period in a liquid crystal capacitor between the pixel electrode 26 and the common electrode 28. In order to prevent the leakage of the held image signal Sn, a storage capacitor 35 is provided between the pixel electrode 26 and the capacitor line 34.

When a voltage signal is thus applied to the liquid crystal layer, the orientation of the liquid crystal molecules are varied according to the voltage level, so that light coming into the liquid crystal layer is modulated to produce imaging light.

Figure 3A:
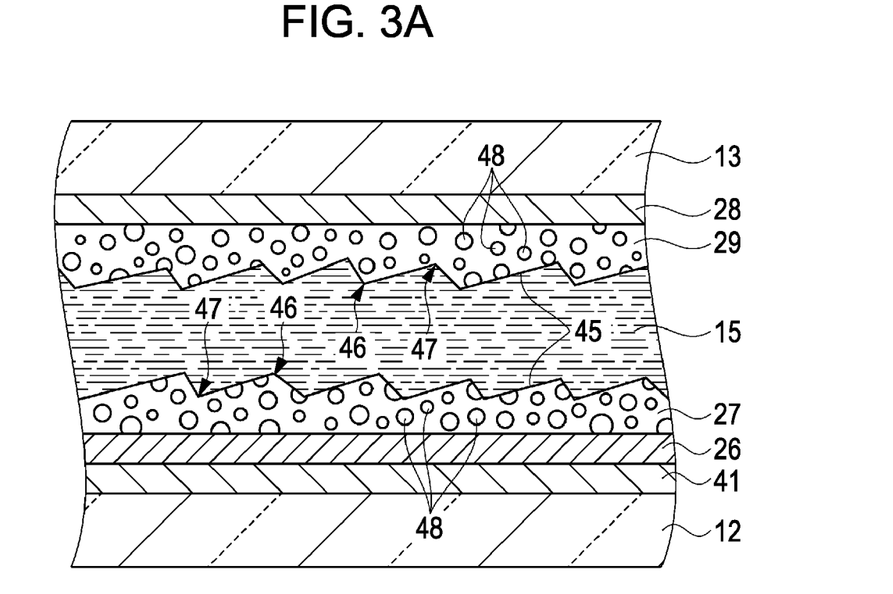
FIGS. 3A and 3B are schematic views of a first alignment layer and a second alignment layer of the liquid crystal device, respectively.
Figure 3B:
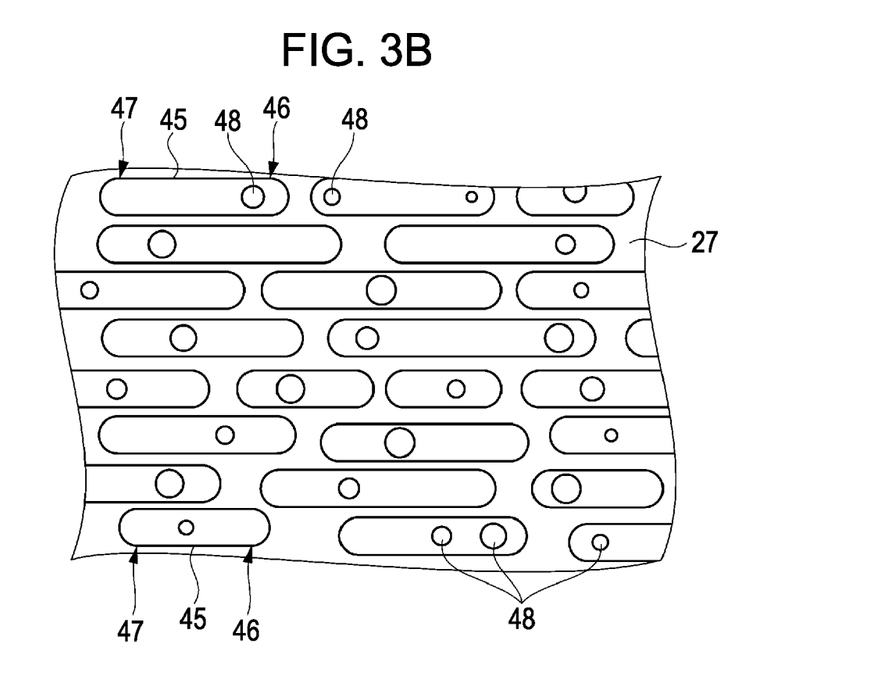

FIGS. 3A and 3B schematically show the alignment layer used in a liquid crystal device: FIG. 3A is a schematic sectional view of the alignment layer and FIG. 3B is a schematic plan view of the alignment layer. The first and the second alignment layer will now be described with reference to FIGS. 3A and 3B. FIG. 3A schematically and simply shows the same structure of the liquid crystal device shown in FIG. 1B.

As shown in FIGS. 3A and 3B, the pixel electrode 26 is disposed on a circuit layer 41 including wires and the TFT element 31 formed on the element substrate 12. The alignment layer 27 is formed over the circuit layer 41. More specifically, the first alignment layer 27 is made of an inorganic porous film having pores 48. For example, the inorganic porous film can be a silicon oxide ($SiO_2$) film exhibiting superior characteristics. Depending on the conditions, alumina ($Al_2O_3$) may be used. The surface (liquid crystal layer 15 side) of the first alignment layer 27 is subjected to a treatment to align the liquid crystal molecules of the liquid crystal layer 15 in a predetermined direction.

The treatment to align the liquid crystal molecules can be performed by, for example, irradiating the surface of the porous film with ion beams in a slanting direction. Consequently, the first alignment layer 27 is provided with grooves 45 slanted with respect to the normal of the element substrate 12. The grooves 45 are formed at irregular positions in the surface of the porous film. Since the width of the groove 45 is set so that liquid crystal molecules can be aligned, and may be set at 50 nm, the liquid crystal molecules can be aligned along the direction in which the grooves 45 extend. Also, a pretilt angle can be controlled by forming the grooves 45 in a slanting direction with ion beams.

More specifically, the grooves 45 extending in a predetermined direction (longitudinal direction) are formed with ion beams in the surface of the first alignment layer 27. The liquid crystal molecules can be oriented along the predetermined direction. Each groove 45 is slanted in a specific direction and has a peak 46 and a valley 47.

The pores 48 of the porous film are exposed at the surface of the alignment layer 27. The pores 48 are smaller than the width of the groove 45 to which the pores 48 belong; hence, the diameters of the pores 48 are smaller than 50 nm. In addition to setting the diameters of the pores 48 at less than 50 nm, the diameters of the pores 48 is preferably set from the viewpoint of the efficiency in absorbing moisture and ions. Since The pores 48 are smaller than the width of the groove 45 to which the pores 48 belong, the control of the liquid crystal orientation can be enhanced.

The second alignment layer 29 is formed on the common electrode 28 on the opposing substrate 13, having the same structure as the first alignment layer 27.

Figure 4:
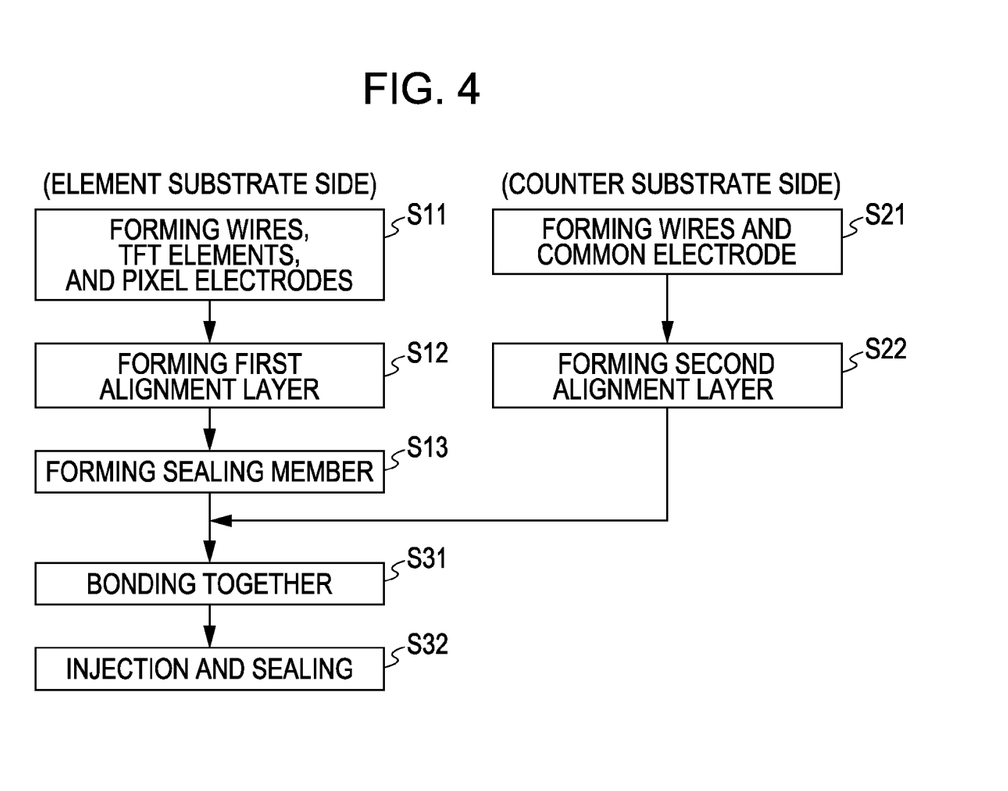
FIG. 4 is a flow diagram of a process for manufacturing the liquid crystal device.
Figure 5:
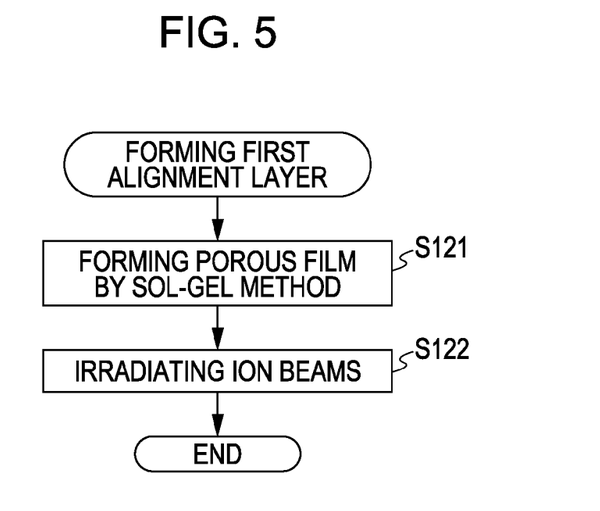
FIG. 5 is a flow diagram of the step of forming the first alignment layer of the liquid crystal device.

FIG. 4 is a flow diagram of a method for manufacturing the liquid crystal device, and FIG. 5 is a flow diagram of the step of forming the first alignment layer in the method. The liquid crystal device manufacturing method will now be described with reference to FIGS. 4 and 5. The process for preparing an assembly of the element substrate 12 side will first be described.

In Step S11, data lines 32 and other lines are formed on an element substrate 12 made of an optically transparent material, such as glass or quartz, and TFT elements 31 and pixel electrodes 26 are further formed, as shown in FIG. 4.

Step S12 forms a first alignment layer 27 on the pixel electrodes 26. The step of forming the alignment layer 27 will be described with reference to FIG. 5, which shows a procedure for forming the alignment layer 27.

In Step S121 (forming a porous film), an inorganic porous film is formed over the pixel electrodes 26 and the element substrate 12 by a sol-gel method. More specifically, a colloidal solution containing, for example, silicon oxide ($SiO_2$) nanoparticles is applied over the pixel electrodes 26 and element substrate 12 by spin coating. Then, the applied colloidal solution is fired at, for example, 250° C. Thus, an inorganic porous film is formed at a thickness of 100 to 200 nm over the pixel electrodes 26 and the element substrate 12.

Step S122 (irradiating ion beams) irradiates the surface of the porous film with ion beams in a slanting direction, using an ion beam apparatus including a filament-type ion source having a diameter of, for example, 250 mm, and an inert gas, for example, argon (Ar). If the liquid crystal device 11 is of twisted nematic (TN)-mode type, argon ($Ar^+$) ion beams are irradiated under the conditions: an acceleration voltage of 700 eV; a beam current density of 1.8 mA/cm$^2$; and an irradiation time of 30 seconds. The incident angle of the ion beams is the same as the direction of the director of the liquid crystal molecules. Thus, the slanting grooves 45 of, for example, 50 nm in width are formed.

When the surface of the porous film is irradiated with ion beams in a slating direction, argon ions flip atoms constituting silicon oxide (shaves the silicon oxide film) to form grooves 45 along the direction of ion beam irradiation. Hence, the surface of the porous film comes into a state in which the surface has been shaved in the direction of ion beam irradiation, as shown in FIG. 3A. Ion beam irradiation allows the pores 48 absorbing moisture or the like to be exposed. In addition, ion beam irradiation less produces nonuniformity than the rubbing, thus increasing the displaying quality.

Thus, the first alignment layer 27 is completed with the grooves 45 for aligning the liquid crystal molecules in the surface and the pores 48 of the porous film exposed at the surface, as shown in FIGS. 3A and 3B.

Step S13 forms the sealing member 14 on the element substrate 12. More specifically, the sealing member 14 is formed of an epoxy resin or the like in a rectangular frame on the element substrate 12 around the display region 17 so as to surround the display region 17. The sealing member 14 may be formed in a unicursal manner starting at, for example, a corner of the display region 17 using a dispenser or the like. Thus, an assembly of the element substrate 12 side is completed.

The process for preparing an assembly of the opposing substrate 13 side will now be described. First, in step S21, wires and a common electrode 28 are formed on an opposing substrate 13 made of an optically transparent material, such as glass or quartz.

Step S22 forms a second alignment layer 29 over the common electrode 28. The second alignment layer 29 can be formed in the same manner as the first alignment layer 27. Thus, an assembly of the opposing substrate 13 side is completed.

In Step S31, the element substrate 12 and the opposing substrate 13 are bonded together. More specifically, the two substrates are bonded in such a manner that the sealing member 14 on the element substrate 12 is disposed between the substrates. After bonding, the sealing member 14 is irradiated with ultraviolet light to be hardened. Thus, an empty structure not containing a liquid crystal material is formed.

In Step S32, a liquid crystal material is injected into the structure through the liquid crystal inlet 51, and then inlet 51 is closed with, for example, a resin sealant 52. Thus, the liquid crystal device 11 is completed.

Figure 6:
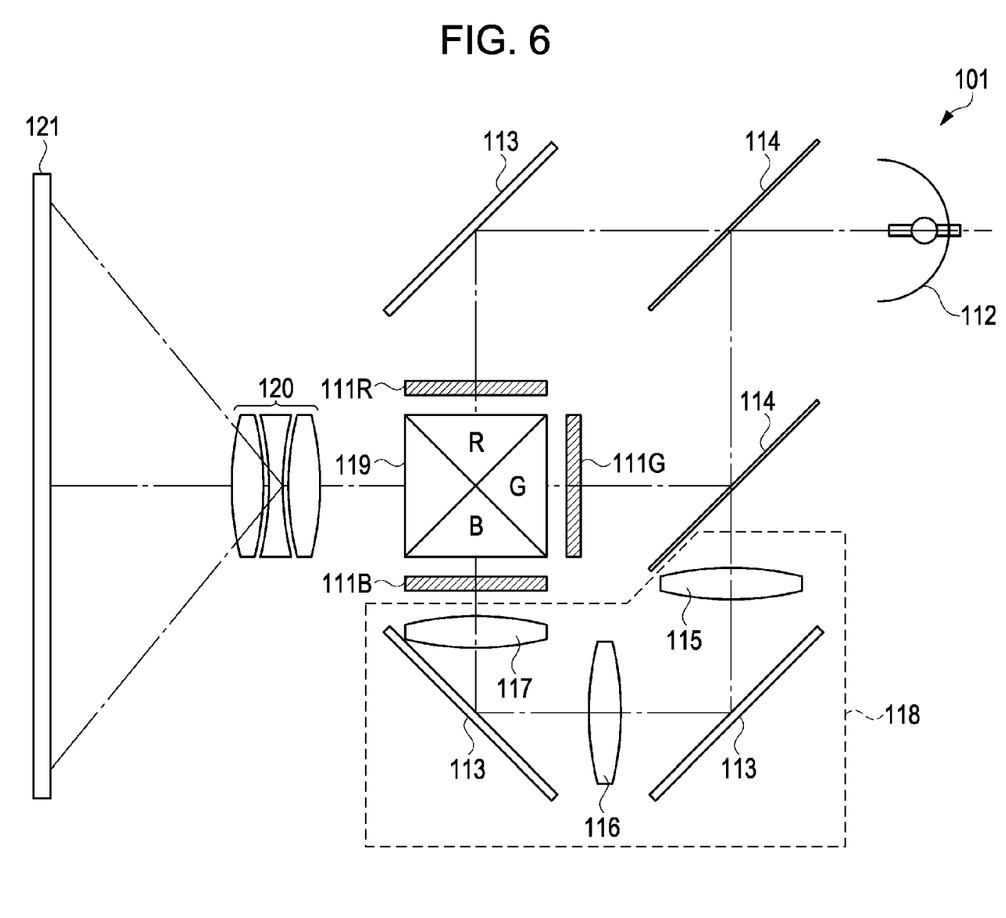
FIG. 6 is a schematic diagram of the structure of a liquid crystal projector as an embodiment of an electronic apparatus including the liquid crystal device.

FIG. 6 is a schematic diagram of the structure of a liquid crystal projector as an embodiment of an electronic apparatus including the liquid crystal device. The liquid crystal projector will now be described with reference to FIG. 6.

The liquid crystal projector 101 includes three liquid crystal modules, each including the liquid crystal device 11. The liquid crystal modules are used as light valves 111R, 111G, and 111B for R, G, and B color, respectively.

More specifically, projection light is emitted from a lamp unit 112 of a white light source, which may be a metal halide lamp, and is split into light components R, G, and B corresponding to the RGB three primary colors and conducted to respective light valves 111R, 111G, and 111B by three mirrors 113 and two dichroic mirrors 114. In particular, light component B is conducted through a relay lens system 118 including an input lens 115, a relay lens 116, and an output lens 117 in order to prevent the loss of light resulting from its long optical path.

The light components R, G, and B corresponding to the three primary colors are modulated by the respective light valves 111R, 111G, and 111B and synthesized again by the dichroic prism 119. The synthesized light is projected as color images on a screen 121 through a projector lens 120.

The liquid crystal projector 101 having the above-described structure can display high-quality images exhibiting, for example, increased contrast, because of the liquid crystal modules including the liquid crystal devices 11. In addition to the liquid crystal projector 101, the liquid crystal device 11 can also be used in other electronic apparatuses, such as highly fine EVF's (electric view finder), cellular phones, mobile computers, digital cameras, digital video cameras, TV sets, vehicle-mounted apparatuses, and audio apparatuses.

The electronic device and electronic apparatus according to the first embodiment have the following advantages:

(1) The first and second alignment layers 27 and 29 are made of an inorganic porous film. The surface of the inorganic film is irradiated with ion beams in a slanting direction with respect to the surface to form the grooves 45 with the pores 48 of the porous film exposed at the surface. The pores 48 exposed at the surface of the alignment layer can easily absorb moisture and impurity ions permeating between the element substrate 12 and the opposing substrate 13. Consequently, the liquid crystal layer and the first and second alignment layers 27 and 29 are prevented from deteriorating. In addition, the porous films of the first and second alignment layers 27 and 29 can prevent the disturbance of the alignment of the liquid crystal molecules more effectively than an alignment layer containing fine particles. In addition, the irradiation of ion beams forms the grooves 45 slanted in a specific direction, thereby controlling a pretilt angle. Thus, display failure, such as light leakage, can be prevented, and the quality of displayed images can be increased, including the contrast.

(2) In the surfaces of the first and second alignment layers 27 and 29, The diameters of some of the pores 48 are smaller than the width of the groove 45 to which the some of the pores 48 belong. Consequently, the liquid crystal molecules can be controlled without disturbing the alignment of the liquid crystal molecules.

(3) Since the first and second alignment layers 27 and 29 have a porous structure, the problem of the alignment layer containing particles does not occur that the particles have larger diameter than the thickness (cell gap) of the liquid crystal layer 15. Accordingly, the structure of the first embodiment meets the demand for a thinner liquid crystal device.

(4) The porous films of the first and second alignment layers 27 and 29 are formed by a sol-gel method. The sol-gel method can simply produce the porous film at a low cost.

Second Embodiment

Figure 7:
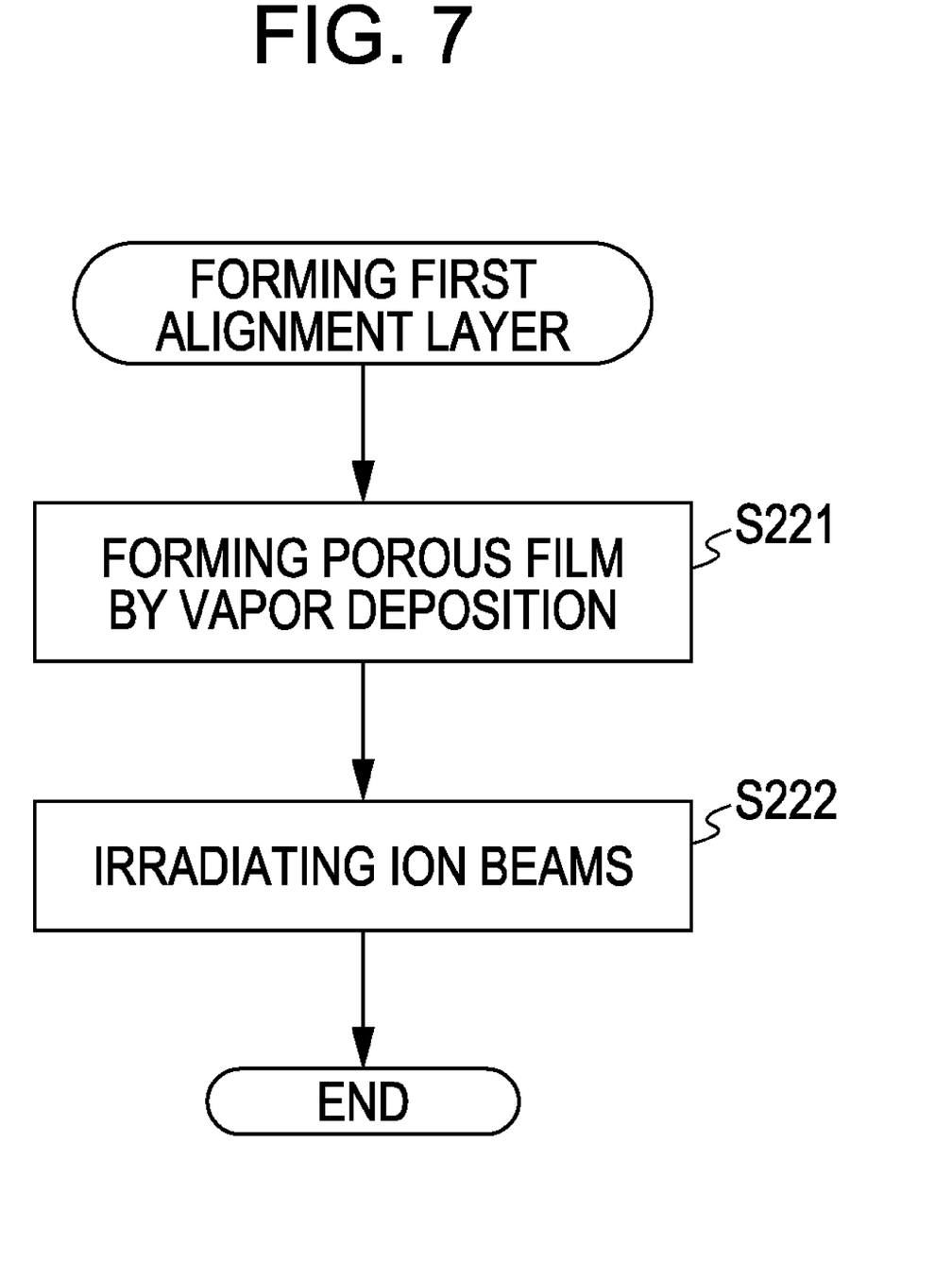
FIG. 7 is a flow diagram of a process for manufacturing a liquid crystal device according to a second embodiment.

FIG. 7 is a flow diagram of a method for manufacturing a liquid crystal device according to a second embodiment of the invention. In the liquid crystal device manufacturing method of the second embodiment, the porous films of the first and second alignment layers are formed by vapor deposition instead of the sol-gel method used in the first embodiment. The method of the second embodiment will now be described with reference to FIGS. 4 and 7. The same parts as in the first embodiment are designated by the same reference numerals and the description for those parts will be omitted or simplified.

In step S11 shown in FIG. 4, first data lines 32 and other liens are formed on the element substrate 12 in the same manner as in the first embodiment, and TFT elements 31 and pixel electrodes 26 are further formed. Then, Step S12 forms the first alignment layer 27. The step of forming the first alignment layer 27 will be described with reference to the procedure shown in FIG. 7.

In Step S221, porous films are formed to a thickness of, for example, 100 to 200 nm on the pixel electrodes 26 and the element substrate 12 by vapor deposition using, for example, silicon oxide ($SiO_2$) as the target.

In Step S222, the surface of the porous film is irradiated with ion beams with an ion beam irradiation apparatus including a filament-type ion source having a diameter of, for example, 250 mm, as in the first embodiment. If the liquid crystal device 11 is of TN-mode type, $Ar^+$ ion beams are irradiated under the conditions: an acceleration voltage of 1200 eV; a beam current density of 2.7 $mA/cm^2$; and an irradiation time of 30 seconds.

By irradiating the surface of the porous film with ion beams, argon ions flip atoms constituting silicon oxide to form grooves 45 in the direction of ion beam irradiation. More specifically, the surface of the porous film is shaved in the direction of ion beams to form slopes, as shown in FIG. 3. Thus, the first alignment layer 27 is completed which has grooves 45 for aligning the liquid crystal molecules in the surface with the pores 48 of the porous film (first alignment layer 27) exposed at the surface.

Then, Steps S13 and S21 are performed in the same manner as in the first embodiment. In Step S22, the second alignment layer 29 is formed on the common electrode 28 in the same steps as Steps 221 and 222. Then, the same steps as Steps S31 and S32 of the first embodiment are performed to complete the liquid crystal device 11 of the second embodiment.

In addition to advantages (1) to (3) of the first embodiment, the second embodiment has the following advantages:

(5) The first and second alignment layers 27 and 29 are formed by vapor deposition. Vapor deposition can form a more uniform, more homogeneous porous film than the sol-gel method used in the first embodiment.

While the invention has been described with reference to the above embodiments, it is not limited to the embodiments and various modifications may be made, including the following modifications.

First Modification

The porous film may be formed by any method without limiting to the sol-gel method or vapor deposition, as long as a film having a high proportion of pores (voidage) can be formed.

Second Modification

Both the first and second alignment layers 27 and 29 are not necessarily formed of an inorganic porous film. For example, either the first alignment layer 27 or the second alignment layer 29 may be formed of an organic film, such as a polyimide film.

Third Modification

The liquid crystal device 11 is not limited to the TN mode type, and may be of transverse electric field type, such as FFS mode type or IPS mode type. In this instance, the grooves 45 may not be slanted.

What is claimed is:

1. A liquid crystal device, comprising:
a first substrate;
a second substrate;
a liquid crystal layer disposed between the first substrate and the second substrate;
a first alignment layer disposed on a side of the first substrate that faces the liquid crystal layer; and
a second alignment layer disposed on a side of the second substrate that faces the liquid crystal layer,
wherein at least one of the first alignment layer and the second alignment layer is made of an inorganic porous film having pores exposed at a surface thereof and grooves controlling the orientation of the liquid crystal layer; and
wherein said grooves are elongated in a predetermined direction, and are disconnected from each other.

2. The liquid crystal device according to claim 1, wherein one of the pores is located within one of the grooves and has a diameter smaller than the width of the groove within which the pore is located.

3. An electronic apparatus, comprising the liquid crystal device as set forth in claim 1.

4. A method of manufacturing a liquid crystal device including a pair of substrates and a liquid crystal layer disposed between the substrates, the method comprising:
   forming an inorganic porous film having pores over at least one of the pair of substrates; and
   irradiating a surface of the porous film with ion beams in a predetermined direction to expose the pores of the porous film and to form disconnected grooves elongated in the predetermined direction for controlling of the orientation of the liquid crystal layer at the surface of the porous film.

5. The method according to claim 4, wherein the inorganic porous film is formed by a sol-gel method.

6. The method according to claim 4, wherein the porous film is formed by vapor deposition.

7. The liquid crystal device according to claim 1, wherein the width of the grooves is about 50 nm.

8. The liquid crystal device according to claim 1, wherein said grooves are arranged in a plurality of rows elongated in the predetermined direction, and the grooves in each rows are intermittently arranged along said row with a spacing between adjacent said grooves.

9. The liquid crystal device according to claim 8, wherein a number of said pores, that are exposed at the surface of the inorganic porous film, are located each completely within one of said grooves.

10. The liquid crystal device according to claim 1, wherein each of said grooves has opposite side walls slanted with respect to a plane of the respective first or second substrate on which the inorganic porous film is disposed.

11. The liquid crystal device according to claim 10, wherein, in each of said grooves, one of the side walls is longer than the other.

12. The liquid crystal device according to claim 11, wherein
   each of said first and second alignment layers is made of said inorganic porous film having said pores and grooves; and
   the longer side walls of the grooves of the first and second alignment layers extend generally in parallel, and
   the shorter side walls of the grooves of the first and second alignment layers extend generally in parallel.

* * * * *